United States Patent [19]

Speranza et al.

[11] 4,323,658

[45] Apr. 6, 1982

[54] POLYISOCYANURATES FROM DIOLS MODIFIED WITH EPOXY RESINS

[75] Inventors: George P. Speranza; Robert L. Zimmerman, both of Austin, Tex.

[73] Assignee: Texaco Inc., White Plains, N.Y.

[21] Appl. No.: 183,610

[22] Filed: Sep. 2, 1980

[51] Int. Cl.³ .................. C08G 18/14; C08G 18/48; C08G 18/32

[52] U.S. Cl. .................. 521/174; 521/177; 521/902; 521/914; 260/410.6; 525/507; 528/73; 528/103; 528/418; 560/263; 568/46; 568/606; 568/609; 568/614; 568/620

[58] Field of Search .................. 568/609, 46, 606, 620, 568/614; 525/507; 521/174, 177, 902, 914; 560/263; 260/410.6; 528/73

[56] References Cited

U.S. PATENT DOCUMENTS

| | | | |
|---|---|---|---|
| 2,830,038 | 4/1958 | Pattison | 260/77.5 |
| 2,990,396 | 6/1961 | Clark et al. | 260/47 |
| 3,010,940 | 11/1961 | Charlton et al. | 260/47 |
| 3,012,984 | 12/1961 | Hudson | 260/37 N |
| 3,242,108 | 3/1966 | McGary et al. | 521/174 |
| 3,317,609 | 5/1967 | Lesesne | 564/374 |
| 3,367,990 | 2/1968 | Bremmer | 525/507 |
| 3,379,791 | 4/1968 | Larson et al. | 525/507 |
| 3,448,046 | 6/1969 | Schalin | 260/45.7 R |
| 3,538,033 | 11/1970 | Hayashi et al. | 260/29.2 |
| 3,691,110 | 9/1972 | Ohfuka et al. | 260/2 EP |
| 4,076,930 | 2/1978 | Ellingboe et al. | 536/1 |
| 4,102,828 | 7/1978 | Klein | 521/174 |
| 4,112,231 | 9/1978 | Weibull et al. | 568/614 |
| 4,113,785 | 9/1978 | Helfert et al. | 260/615 B |
| 4,266,043 | 5/1981 | Fujii et al. | 521/174 |

FOREIGN PATENT DOCUMENTS 968102 8/1964 United Kingdom .

OTHER PUBLICATIONS

Chemical Abstracts 76: 34874x (1972) Japanese Kokai 71-24,255, (7/71), (Cl.C08g), Toshiyuki, et al., Polyurethane Foams.
Chemical Abstracts 75: 77767m (1971) Ger. Offen. 2,056,080, (5/71), (Cl.C08g), Hawkins, Hardenable Epoxy Resin Compositions.
Chemical Abstracts 72: 44631x (1970) Ger. Offen. 1,905,696, (12/69), (Cl.C08g), Davis, et al., Polyurethane Latexes.
Chemical Abstracts 78: 160468x (1973) Belgian Pat. 785,020, (12/72), (Cl.C08g), Jacques, et al., Modified Epoxy Resins.
Chemical Abstracts 66: 56127b (1967) Neth. Appl. 6,605,205, (10/66), (Cl.C08g), Fire-Resistant Polyurethanes.

*Primary Examiner*—H. S. Cockeram
*Attorney, Agent, or Firm*—Carl G. Ries; Robert A. Kulason; David L. Mossman

[57] ABSTRACT

A method of preparing polyether polyols in the 200–1000 molecular weight range by modifying a polyol initiator with an epoxy resin and one or more alkylene oxides is described. The modified polyols may be used in preparing rigid isocyanurate foams with improved compressability and flammability properties.

22 Claims, No Drawings

POLYISOCYANURATES FROM DIOLS MODIFIED WITH EPOXY RESINS

This application is related to applications Ser. Nos. 183,543, 183,558 and 183,611, filed of even date.

BACKGROUND OF THE INVENTION

1. Field of the Invention

The invention relates to the modification of polyols by the addition of epoxy resin and, more particularly, relates to the addition of epoxy resin to low functionality polyols at places other than the end of the polyol chain to produce a modified polyol in the 200-1000 molecular weight range suitable for use in improved rigid polyisocyanurate foam formulations.

2. Description of the Prior Art

Presently, polyether polyols suitable for use in rigid isocyanurate foams are made by the reaction of diols or triols with 1,2-alkylene oxides. Persons skilled in the art of making polyols can add alkylene oxides to polyhydric initiators such as glycerine, ethylene glycol, diethylene glycol, etc. to prepare products in the 125-1000 hydroxyl number range. While generally satisfactory, foam prepared from these prior art polyols have poor compressive strengths and poor dimensional stability. Therefore, it is an object of this invention to increase the functionality of low molecular weight diols or triols by their reaction with epoxy resins to prepare a new type of polyether polyol which would produce improved rigid polyisocyanurate foams.

Other patents disclose reactions involving polyols and epoxy resins. Japanese Patent No. 71-24,255 concerns the reaction of an alkylene glycerine based 3,000 molecular weight triol with 2% bisphenol A epoxy resin to produce foams with increased hardness. A close examination of this patent will show that the epoxy resin is added only at the end of the polyol chain. Our invention involves the addition of diols to polyepoxides so that the epoxy resin derivative is in the interior of the polyol. The preparation of our products is more easily accomplished and is more reproducible.

U.S. Pat. No. 3,012,984 describes how hydroxyl terminated polyesters, epoxy resins and isocyanate terminated prepolymers may be reacted in an inert organic solvent to produce metal primers and coatings. U.S. Pat. No. 3,010,940 discloses how phenol, epoxy resins, polyisocyanates and alpha-methylbenzyldimethylamine react to produce various polyurethane coatings. U.S. Pat. No. 3,448,046 describes how polyols containing chlorine are mixed with epoxy resins before reaction with an isocyanate. The free epoxides scavenge the HCl in the polyol and do not contribute to the functionality of the resulting polyol. The reaction of an epoxide with an alcoholic hydroxyl groups is set out in U.S. Pat. No. 3,317,609. Further, British Pat. No. 968,102 describes how polyols suitable for polyurethane foams may be prepared from the reaction of a polyol, and an epoxy resin in the presence of an acidic catalyst.

Further prior art polyols include those described in German Offenlegungschrifft No. 2,056,080. This patent describes how epoxy adhesives may be made by the reaction of epoxy resins with 4-mercaptobutanol-blocked urethane prepolymers which are made from toluene diisocyanate and various polyols. German Offenlegungschrifft No. 1,905,696 discloses how polyurethane lattices may be produced by chain-extending a urethane prepolymer by using the reaction product of polyethylene glycols of a molecular weight of about 5,000 to 10,000, and an aromatic diglycidyl ether. The modification of epoxy resins by heating them with added polyalkoxylated disaccharides is described in Belgium Pat. No. 785,020.

SUMMARY OF THE INVENTION

The invention concerns modified polyether polyols that are suitable for use in rigid polyisocyanurate foams, the modified polyols being produced by the reaction of a low molecular weight polyol initiator having a hydroxyl functionality of less than three, an epoxy resin and one or more alkylene oxides in such a way that the addition of epoxy resin to the mixture is completed before the addition of alkylene oxides is completed so that the epoxy resin is added at selected points internally along the length of the modified polyol. The invention also concerns methods of making the modified polyols, improved rigid isocyanurate foams from the polyols and methods of making such foams.

DESCRIPTION OF THE PREFERRED EMBODIMENTS

The modified polyols of this invention may be made by reacting a low molecular weight polyol initiator with epoxy resins and one or more alkylene oxides to extend the polyol chain in such a manner that the epoxy resin is added at selected points internally along the length of the polyol chain. This tends to increase the overall functionality of the polyol chain. Prior art techniques, discussed above, add epoxy resin at the end only. It has been found that a large amount of epoxy resin in proportion to the low molecular weight polyol may be used without detrimental effect to the resulting polyol properties, as may be seen by Example II. The epoxy resin may be added before, during and/or after the addition of alkylene oxide to the polyol initiator but the best results are obtained if the resin is not added as a "cap", that is, after all of the oxide has been added which results in the resin being attached to the end of the resulting polyol chain only. It has been found that the preferred method of proceeding is to complete addition of the epoxy resin to the low molecular weight polyol before the addition of one or more alkylene oxides. One skilled in the art who is practicing this invention may determine the best procedure with respect to when additions should be made and at what temperature and during which times the reaction mixture is to be heated within the scope of this invention.

It is well known that polyethers for polyurethane applications for example, are prepared by the base catalyzed reaction of propylene oxide with an initiator having multiple hydroxyl groups. Examples of suitable initiators are propylene glycol, glycerine, ethylene glycol and polyethylene glycols. The polyols to be used as initiators in the instant invention are preferred to be low molecular weight monohydric or dihydric alcohols, or mixtures thereof, in other words, polyols having a hydroxyl functionality of less than three. If base catalysis is used, alkaline catalysts normally employed are sodium hydroxide and potassium hydroxide. Other techniques to prepare polyols are known to those skilled in the art.

The alkylene oxides useful in this invention are ethylene oxide, propylene oxide and 1,2-butylene oxide. Ethylene oxide is preferred for this invention, and this reactant is used in the examples herein. More than one alkylene oxide may be added to the reaction mixture as deemed necessary by one skilled in the art practicing this invention.

It is anticipated that a wide variety of epoxy resins would be useful in practicing this invention. The vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred. The diglycidyl ether of disphenol A and an epoxy novolac resin are used in the examples herein. Some of these epoxy resins are known in the trade as "Epon" resins and may be obtained from Shell Chemical Co.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol polyhydric thioethers, such as 2,2'-, 3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novolak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The reaction conditions of temperature and pressure may be selected by the invention practitioner to meet certain specifications required by the polyol for a particular use. The examples herein use pressures between 20 psi and about 60 psi and temperatures between about 70° C. to 115° C. as representative conditions for the making of polyols that would be useful in rigid foams. These parameters are the preferred conditions for this invention. A wider temperature range could conceivably be used, but if temperatures on the order of 150° C. or higher are used, undesirable byproducts are formed. The modified polyol resulting from the method of this invention would preferably have a molecular weight in the range of about 200 to 1,000 to accomplish the purposes set out herein. Also, the modified polyol should have an OH number in the range from about 125 to 1000 and preferably in the range from about 200 to 600.

Examples I through V show the preparation of the modified polyols described herein. The formulations are prepared by a similar procedure except that the epoxy resin is added under different conditions to the reaction mixture. There is also a variation as to the amount of alkylene oxide added to each reaction mixture. Example VI shows how modified polyols and prior art polyols may be used to prepare rigid polyisocyanurate foams, and comparative data between the two are presented.

EXAMPLE I

A 5 gallon kettle was charged with 8.00 lb. of diethylene glycol, 13.3 grams of 2,4,6-tris(dimethylaminomethyl)phenol and 2.12 lb. of EPON ® 828, diglycidyl ether of disphenol A, manufactured by Shell Chemical Company. The reaction was heated to 110° C. and held for 15 minutes. Ethylene oxide (20.09 lb.) was then added and the reaction was digested for two hours. The kettle was then vented and placed under 20 mm Hg vacuum for fifteen minutes. Following this stripping, the polyol was cooled and discharged. The product had the following properties:

| Hydroxyl number | 290 |
| --- | --- |
| pH in 10:6 isopropanol water | 10.3 |
| Water, weight % | 0.02 |
| Viscosity at 25° C., centipoise | 137 |
| Total amine meq/g | 0.01 |
| Total epoxides meq/g | 0.008 |

EXAMPLE II

A 5 gallon kettle was charged with 8.00 lb. of diethylene glycol and 133 grams of 2,4,6-tris(dimethylaminomethyl)phenol. The mixture was heated to 70° C. and 8.00 lb. of EPON 828 was added. It was then heated to 100° C. and digested for fifteen minutes. At this temperature, ethylene oxide (14.21 lb.) was added. The reaction was heated to 115° C. and digested for one hour. The kettle was then vented and placed under 20 mm Hg vacuum for fifteen minutes. Following the stripping step, the polyol was cooled and discharged. It had the following properties:

| Hydroxyl number | 304 |
|---|---|
| pH in 10:6 isopropanol water | 12.5 |
| Water, wt. % | 0.01 |
| Viscosity at 25° C., cps | 1300 |
| Total amine meq/g | 0.09 |
| Number average molecular wt. | 548 |
| Average functionality | 2.97 |

This example shows the surprisingly low viscosity obtained even when a large amount of EPON 828 is used. It also shows the increase of functionality from 2 to 2.97 over the prior art polyol made from the addition of the ethylene oxide to the glycol.

EXAMPLE III

A five gallon kettle was charged with 8.0 lb. of dipropylene glycol and 72 g of potassium hydroxide in 200 ml of methanol. The mixture was heated to 70° C. under vacuum to remove the methanol. Then 6.0 lb. of EPON 828 were added and the reaction heated to 110° C. and held for one-half hour. At this temperature 14.0 lb. of propylene oxide was added. The reaction was allowed to digest for 3 hours, then neutralized with 79.2 grams of oxalic acid dihydrate. Filter aid and water were also added at this time. The reaction was then placed under 5 mm Hg vacuum at 80° C. for one hour followed by discharging through a filter. The product had the following physical properties:

| Hydroxyl number | 248 |
|---|---|
| pH in 10:6 isopropanol water | 5.5 |
| Water, wt. % | 0.05 |
| Viscosity at 25° C., cps | 1325 |

The following examples used the same procedure as in Example 3. The differences being in the materials charged.

| Example Number | IV | V |
|---|---|---|
| Charge | | |
| Epoxy novolak resin DEN® 438 (grams)[1] | 40 | — |
| EPONEX® 1513 (grams)[2] | — | 40 |
| Diethylene glycol (grams) | 212 | 212 |
| Ethylene oxide (grams) | 548 | 548 |
| Potassium hydroxide | 16 | 25 |
| Oxalic acid dihydrate | 17.6 | 27.5 |
| Properties | | |
| Hydroxyl number | 294 | 287 |
| pH in 10:6 ispropanol-water | 5.4 | 5.2 |
| Water, wt. % | 0.06 | 0.06 |
| Viscosity at 25° C., cps | 132 | 115 |

[1]Polyglycidyl ether of phenol-formaldehyde novolac, equivalent weight 176-181, sold by Dow Chemical Co.
[2]an epoxy resin sold by Shell Chemical Co., equivalent weight 232.

EXAMPLE VI

This example illustrates the use of the epoxy resin modified polyols in isocyanurate foams. It will further show the improvement in both compressive strength and Butler Chimney burn tests in foams when epoxy resin is added to the polyol over foams made from a prior art polyol. The compressive strength is improved from about 7.8 to 34.3 percent over the prior art and the average weight returned in the Butler Chimney test is greater in foams made with the modified polyol. A fire retardant was added to foams D, E and F to demonstrate that the modified polyols would be effective in such formulations. A surprising result is that the other properties of the foams made from the modified polyols were not diminished or were affected so slightly as not be of consequence.

The catalyst used in all foam formulations herein is the potassium salt of a carboxyl terminated compound made from aminated alkoxylated aliphatic alcohol and described in U.S. Pat. No. 4,235,811 with the following structure:

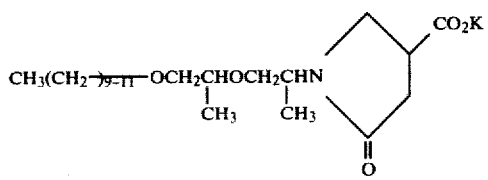

Other catalysts useful in my invention are tertiary amines, quaternary ammonium carboxylates, metallic carboxylates and other isocyanurate catalysts.

| Formulation | A | B | C | D | E | F |
|---|---|---|---|---|---|---|
| Polyol Example I | 19.1 | — | — | 17.7 | — | — |
| Polyol Example II | — | 18.5 | — | — | 17.2 | — |
| JEFFOX PEG-400[1] | — | — | 19.7 | — | — | 18.3 |
| Silicone DC®-193[2] | 0.5 | 0.5 | 0.5 | 0.5 | 0.5 | 0.5 |
| Trichlorofluoromethane[3] | 12.5 | 12.5 | 12.5 | 12.5 | 12.5 | 12.5 |
| FYROL CEF®[4] | — | — | — | 6.0 | 6.0 | 6.0 |
| Catalyst | 1.5 | 1.5 | 1.5 | 1.5 | 1.5 | 1.5 |
| MONDUR MR®[5] | 66.4 | 67.0 | 65.8 | 61.8 | 62.3 | 61.2 |
| Index[6] | 5 | 5 | 5 | 5 | 5 | 5 |
| Reaction Profile | | | | | | |
| Cream time (sec) | 5 | 6 | 5 | 5 | 6 | 5 |
| Tack free time (sec) | 9 | 12 | 10 | 10 | 12 | 10 |
| Rise time (sec) | 15 | 17 | 16 | 16 | 22 | 18 |
| Physical Properties | | | | | | |
| Density lb/ft[3] | 2.37 | 2.54 | 2.23 | 2.30 | 2.42 | 2.21 |
| K-factor BTU in/hr ft.[2] °F. | 0.124 | 0.128 | 0.124 | 0.125 | 0.122 | 0.120 |
| Compressive strength | | | | | | |
| with rise psi | 44.3 | 50.7 | 38.5 | 41.8 | 47.0 | 38.9 |
| cross rise psi | 15.8 | 20.5 | 13.6 | 15.2 | 19.6 | 12.5 |

-continued

| Formulation | A | B | C | D | E | F |
|---|---|---|---|---|---|---|
| Friability % weight loss | 11.9 | 27.0 | 8.5 | 13.1 | 30.6 | 10.1 |
| Heat distortion °C. | >225 | >225 | >225 | >225 | >225 | >225 |
| % closed cells | 91.7 | 91.9 | 92.18 | 92.4 | 93.0 | 92.2 |
| Butler Chimney | | | | | | |
| Average weight returned % | 90.6 | 93.1 | 88.9 | 95.1 | 95.6 | 94.6 |
| Seconds to extinguish | 11.7 | 10 | 11.5 | 10 | 10 | 10 |
| Flame height, inches | >11 | 8 | >11 | 5 | 5.0 | 5.0 |
| One week dimensional stabilities | | | | | | |
| 158° F./100% relative humidity | | | | | | |
| vol. % | +5 | +5 | +5 | +4 | +4 | +2 |
| wt. % | −2 | +9 | −6 | −5 | −2 | −7 |
| lin % | +3 | +3 | +4 | +2 | +2 | +2 |
| 200° F./dry | | | | | | |
| vol. % | +5 | −3 | +9 | +5 | +3 | +7 |
| wt. % | −3 | −3 | −4 | −4 | −2 | −5 |
| lin % | +3 | +3 | +6 | +4 | +2 | +5 |
| −20° F./dry | | | | | | |
| vol. % | −4 | −4 | −7 | −4 | −4 | −8 |
| wt. % | +1 | +1 | +1 | 0 | +1 | +1 |
| lin % | −2 | −2 | −3 | −3 | −2 | −5 |

[1] Polyethylene glycol of 400 molecular weight made in a fashion comparable to the polyols of Examples I and II except that no epoxy resin was added, made by Texaco Chemical Co.
[2] Silicone surfactant sold by Dow-Corning added as a stabilizer to obtain uniform cells.
[3] Added as the blowing agent
[4] Tris (β-chloroethyl)phosphate sold by Stauffer as a fire retardant.
[5] Polymeric isocyanate sold by Mobay, equivalent weight about 134.
[6] Equivalent ratio of NCO groups to OH groups.

Many modifications and variations of the invention as herein set forth may be made without departing from the spirit and scope thereof, and therefore, only such limitations should be imposed as are indicated in the following claims.

We claim:

1. A modified polyether polyol being produced by a method comprising the following steps
   (a) mixing a low molecular weight polyol initiator having a hydroxyl functionality of less than three with an epoxy resin,
   (b) heating the mixture in (a) to a temperature between about 70° C. to 115° C. for a period of time and
   (c) adding to the heated mixture one or more alkylene oxides.

2. The modified polyether polyol as described in claim 1 in which the resulting modified polyol has a molecular weight in the range of about 200 to 1,000.

3. The modified polyether polyol as described in claim 1 in which the epoxy resin is selected from the group of epoxy resins consisting of the diglycidyl ether of Bisphenol A, epoxy novolak resins, and aliphatic epoxy resins.

4. The modified polyether polyol as described in claim 1 in which the alkylene oxides are taken from the group consisting of ethylene oxide, propylene oxide and butylene oxide.

5. The modified polyether polyol as described in claim 1 in which the components are reacted in the pressure range between about 20 psi and about 60 psi during the preparation of the modified polyol.

6. The modified polyether polyol as described in claim 1 in which the resulting modified polyol has an OH number in the range of about 200 to 600.

7. A modified polyether polyol having a molecular weight in the range of about 200 to 1,000 and being produced by a method comprising the following steps
   (a) mixing a low molecular weight polyol initiator having a hydroxyl functionality of two with an epoxy resin selected from the group of epoxy resins consisting of the diglycidyl ether of Bisphenol A, epoxy novolak resins and aliphatic epoxy resins,
   (b) heating the mixture in (a) to a temperature between about 70° C. to 115° C. for a period of time and
   (c) adding to the heated mixture one or more alkylene oxides.

8. A method of preparing a modified polyether polyol comprising the following steps
   (a) mixing a low molecular weight polyol initiator having a hydroxyl functionality of less than three with an epoxy resin,
   (b) heating the mixture in (a) to a temperature between about 70° C. to 115° C. for a period of time and
   (c) adding to the heated mixture one or more alkylene oxides.

9. A method of preparing a modified polyether polyol as described in claim 8 in which the resulting modified polyol has a molecular weight in the range of about 200 to 1,000.

10. A method of preparing a modified polyether polyol as described in claim 8 in which the epoxy resin is selected from the group of epoxy resins consisting of the diglycidyl ether of Bisphenol A, epoxy novolak resins, and aliphatic epoxy resins.

11. A method of preparing a modified polyether polyol as described in claim 8 in which the alkylene oxides are taken from the group consisting of ethylene oxide, propylene oxide and butylene oxide.

12. A method of preparing a modified polyether polyol as described in claim 8 in which the components are reacted in the pressure range between about 20 psi and about 60 psi during the preparation of the modified polyol.

13. A method of preparing a modified polyether polyol as described in claim 8 in which the resulting modified polyol has an OH number in the range of about 200 to 600.

14. A method of preparing a modified polyether polyol comprising the following steps (a) mixing a low molecular weight polyol initiator having a hydroxyl functionality of two with an epoxy resin selected from the group of epoxy resins consisting of the diglycidyl ether of Bisphenol A, epoxy novolak resins, and aliphatic epoxy resins, (b) heating the mixture in (a) to a temperature between about 70° C. to 115° C. for a period of time and (c) adding to the heated mixture one or more alkylene oxides.

15. An improved rigid polyisocyanurate foam produced by the reaction of a modified polyol, an organic polyisocyanate and a foam catalyst wherein the improvement comprises making the modified polyol by a method comprising the following steps (a) mixing a low molecular weight polyol initiator having a hydroxyl functionality of less than three with an epoxy resin, (b) heating the mixture in (a) to a temperature between about 70° C. to 115° C. for a period of time and (c) adding to the heated mixture one or more alkylene oxides.

16. A method for producing an improved rigid polyisocyanurate foam which comprises (a) making a modified polyol by a method comprising the following steps (1) mixing a low molecular weight polyol initiator having a hydroxyl functionality of less than three with an epoxy resin, (2) heating the mixture in (1) to a temperature between about 70° C. to 115° C. for a period of time and (3) adding to the heated mixture one or more alkylene oxides, and (b) reacting said modified polyol with an organic polyisocyanate and one or more suitable foam catalysts.

17. The modified polyol of claim 1 in which heating step (b) occurs for at least fifteen minutes and in which the reaction mass containing initiator, epoxy resin and alkylene oxide is continued to be heated in the range between about 70° C. and 115° C. after the alkylene oxide is added for about one hour or more before the modified polyol is stripped out in a final separation step.

18. The modified polyol of claim 7 in which heat-step (b) occurs for at least fifteen minutes and in which the reaction mass containing initiator, epoxy resin and alkylene oxide is continued to be heated in the range between about 70° C. and 115° C. after the alkylene oxide is added for about one hour or more before the modified polyol is stripped out in a final separation step.

19. The method of claim 8 in which heating step (b) occurs for at least fifteen minutes and in which the reaction mass containing initiator, epoxy resin and alkylene oxide is continued to be heated in the range between about 70° C. and 115° C. after the alkylene oxide is added for about one hour or more before the modified polyol is stripped out in a final separation step.

20. The method of claim 14 in which heating step (b) occurs for at least fifteen minutes and in which the reaction mass containing initiator, epoxy resin and alkylene oxide is continued to be heated in the range between about 70° C. and 115° C. after the alkylene oxide is added for about one hour or more before the modified polyol is stripped out in a final separation step.

21. The improved foam of claim 15 in which heating step (b) occurs for at least fifteen minutes and in which the reaction mass containing initiator, epoxy resin and alkylene oxide is continued to be heated in the range between about 70° C. and 115° C. after the alkylene oxide is added for about one hour or more before the modified polyol is stripped out in a final separation step.

22. The method of claim 16 in which heating step (2) occurs for at least fifteen minutes and in which the reaction mass containing initiator, epoxy resin and alkylene oxide is continued to be heated in the range between about 70° C. and 115° C. after the alkylene oxide is added for about one hour or more before the modified polyol is stripped out in a final separation step.

* * * * *